March 11, 1958
L. L. HERCIK
2,825,913
ROTATABLE THREADED ELEMENT OPERATIVE TO RECIPROCATE
COLLAPSING MEANS FOR COLLAPSIBLE
THREAD CHASERS IN A DIE HEAD
Filed May 28, 1954
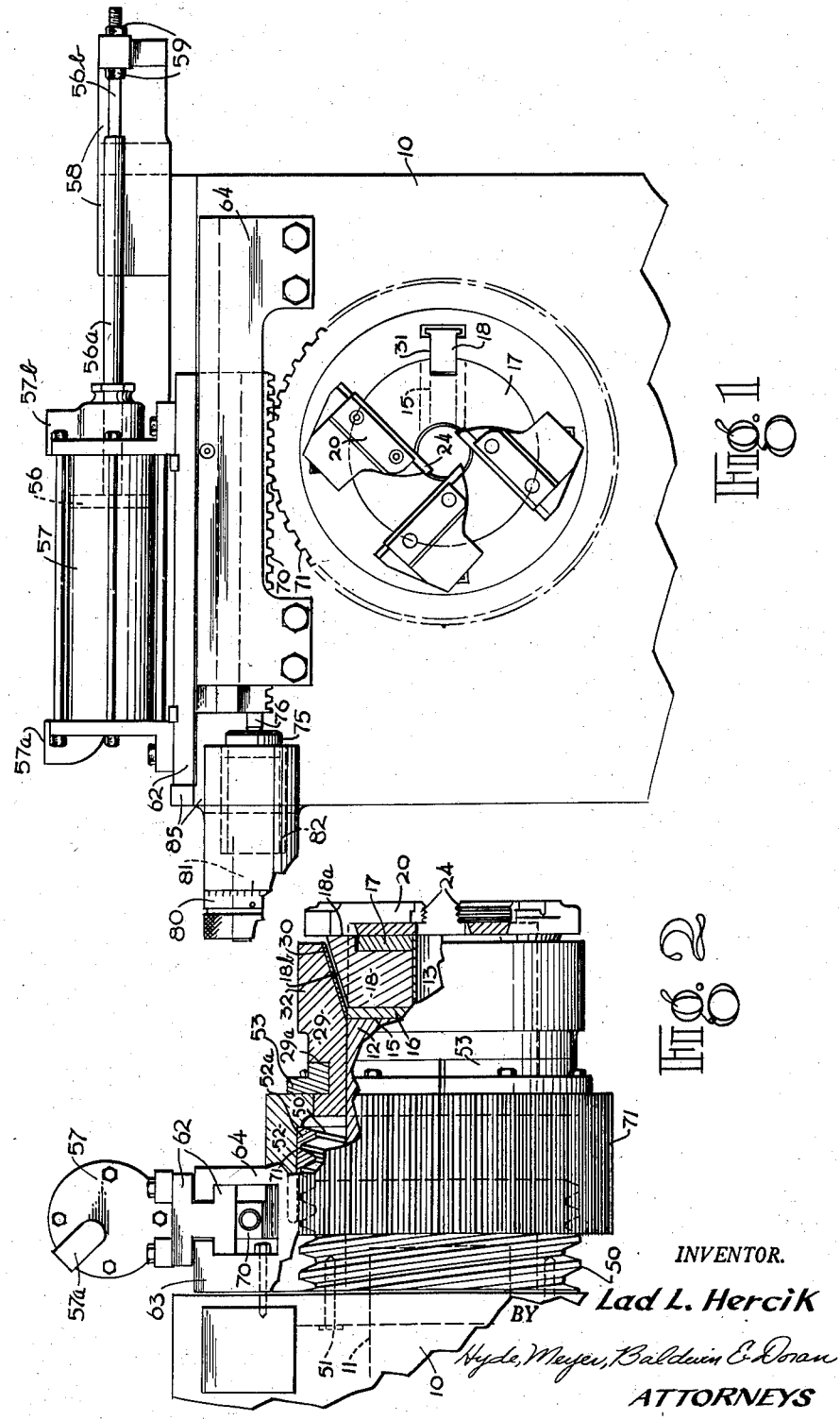
INVENTOR.
Lad L. Hercik
BY
Hyde, Meyer, Baldwin & Doran
ATTORNEYS United States Patent Office 2,825,913
Patented Mar. 11, 1958

2,825,913

ROTATABLE THREADED ELEMENT OPERATIVE TO RECIPROCATE COLLAPSING MEANS FOR COLLAPSIBLE THREAD CHASERS IN A DIE HEAD

Lad L. Hercik, Lakewood, Ohio

Application May 28, 1954, Serial No. 433,125

7 Claims. (Cl. 10—95)

This invention relates to improvements in a thread cutting apparatus and more particularly to an air-operated die head assembly for a threading machine.

One of the objects of the present invention is to provide a thread cutting apparatus having thread chaser holders with means for adjusting the position of the holders while the thread cutting head is rotating.

Another object of the present invention is to provide a thread cutting apparatus having screw threaded elements for moving the thread cutting chasers between a thread cutting position and a clearance position for removal from the work piece.

A further object of the present invention is to provide a thread cutting apparatus wherein the thread cutting chasers are movable in and out by a fluid pressure actuated motor.

A further object of the present invention is to provide a thread cutting apparatus having power actuation of the thread cutting chasers through a rack and pinion drive.

A further object of the present invention is to provide a thread cutting apparatus, and more particularly a rotatable die head, being characterized by its structural simplicity, ease of assembly, strong and sturdy nature, its inexpensive manufacturing cost, and its operating efficiency.

Other features of this invention reside in the arrangement and design of the parts for carrying out their appropriate functions.

Other objects and advantages of this invention will be apparent from the accompanying drawings and description and the essential features will be set forth in the appended claims.

In the drawings,

Fig. 1 is a front elevational view of a rotatable die head on a thread cutting machine; while Fig. 2 is a side elevational view, partially in central section, of the rotatable die head of Fig. 1 with the stop bracket on the left in Fig. 1 omitted for clarity.

While the present invention might be adapted to various types of thread cutting apparatus, die heads and threading machines, I have chosen to show the same as applied to a rotatable die head of the general type described in U. S. Patent No. 2,292,788, issued August 11, 1942, to M. W. Lamprecht. In its broader aspects, this invention relates to any apparatus for cutting threads on a work-piece, and is here illustrated as a rotatable die head with adjustable thread-cutting chasers movable between a closed or thread cutting position and an open or clearance position for removal from the workpiece. However, it should be clearly understood that the principle involved in the present invention can be readily applied to an adjustable tap with chasers movable between these positions. This invention also contemplates use of the structure herein not only on rotatably driven thread cutting apparatus wherein the workpiece is not rotated, but also on thread cutting apparatus fixed against rotation wherein the workpiece is rotated.

The present invention can be used on nearly any conventional die head or thread cutting apparatus; the rotatable die head in U. S. Patent No. 2,292,788 being used only for illustrative purposes.

In Figs. 1 and 2, the threading machine is disclosed as having a head stock 10 fixed to the machine frame and being stationary. Suitable drive means are provided on the machine for rotating a hollow drive spindle 11 so as to rotate the die head or other thread cutting apparatus. While the die head rotates, a workpiece or stock to be threaded is fed from the right toward the left in Fig. 2 between the thread cutting chasers in the die head, with this stock or workpiece held against rotation so that a thread will be cut on the periphery thereof.

The die head in the present disclosure has many features in common with the die head disclosed in said U. S. Patent No. 2,292,788, and same reference numerals will be used herein as found in said patent for convenience in reference thereto for further disclosure if necessary. A barrel-shaped die head body 12 is secured by threads, a flanged connection, or the like to the spindle 11 so as to rotate therewith. This barrel 12 has a central opening 13 for the reception of stock or a workpiece to be threaded. The barrel or die head body 12 is generally cylindrical and is provided at its forward end with a plurality of radially extending pockets 15, in the present instance four of such pockets being provided. These pockets each have a hardened steel lining 16 and are closed at the forward end by a hardened steel face plate 17 which is secured by screws to the barrel 12. Radially slidable in each pocket is a radially moving movable slide 18 with a portion 18a over-hanging the faceplate 17 in Fig. 2. Each slide 18 has detachably mounted thereon a thread cutting chaser or die 24 of the tangential type by means of a thread cutting chaser mounting block 20. It should be understood that the term thread chaser holder, as used herein, refers to the combined structure of the slide 18 and mounting block 20, slide 18 per se when the thread cutting chaser is mounted directly thereon, or any other equivalent structure found in a conventional die head.

Many novel features of this invention are also applicable when different types of thread cutting chasers are used, not only the tangential type illustrated, but also a thread cutting chaser fixed directly to the slide 18 and extending in a generally radial direction. In any case, the thread cutting chaser holders are operatively connected to the die head body or barrel 12 so as to be capable of generally radial, adjustable, inward and outward movement between a thread cutting inward position and an outward clearance position for removal of the workpiece.

This named U. S. patent also discloses means for controlling the radial position of the die slides 18 comprising a die ring 29 telescoped over the body barrel 12 and slidable thereon where their surfaces mutually engage at 30. The radially outermost faces of the die slides are inclined toward the axis of the die head from the front to the rear (from right to left in Fig. 2) of each die slide as indicated at 18b. The die ring 29 is provided with pockets 31 for receiving the radially outermost portions of the slides 18. One of these pockets is clearly illustrated in Fig. 1 and each has an inclined face (Fig. 2) complementary to the surface 18b of its associated slide. Each slide is generally T-shaped, as shown in Fig. 1, and the associated pocket 31 is of a complementary shape so that the die slides 18 are definitely held in any given radial position depending upon the location of the die ring 29 axially on the barrel 12. Preferably the T-shaped portion of each pocket 31 is provided with a hardened steel lining in the manner illustrated. Hence, this sleeve 29 acts as a chaser holder moving means or sleeve, telescoped over the body 12 and operatively connected with the thread cutting chaser holding slide 18 by coacting tapered surfaces, for causing radial movement of said slides inwardly or outwardly in response to axial movement of sleeve 29 over the body 12.

It will be apparent as the description proceeds that the die ring 29 need not move the slides 18 in both directions between the positions. For example, the die ring 29 may move the slides 18 in the inward direction from the clearance position to the thread cutting position and then suitable resilient means, such as springs, may move the slides 18 outwardly to the clearance position while the die ring 29 is moving to the left in Fig. 2, as disclosed in my copending U. S. patent application, Serial No. 433,127 filed May 28, 1954, and entitled "Thread Cutting Die Head."

The present invention is primarily concerned with structure for moving a thread cutting chaser in and out between the thread cutting position and clearance position and with the adjustment for the thread cutting die size in the thread cutting position. The present invention is directed to structure and features not found in the aforementioned prior art patent.

Means is provided to move axially the thread-cutting chaser actuating sleeve 29 so as to move the thread chasers between the aforementioned extreme positions. This means includes a male or externally threaded element 50 coacting with a female threaded sleeve element 52 serving as a thread follower element thereon. Both of these elements 50 and 52 are telescoped over the rotatable die head body 12, as clearly shown in Fig. 2, and have coacting Acme threads thereon. The male threaded element 50 is secured by screws 51 to the head stock 10 to be stationary therewith and fixed against axial and rotative movement. If desired, Babbitt metal 52a may be poured into a groove in the bore of sleeve 52 so as to form the Acme threads. With this construction, if any jamming should occur during operation, the Babbitt threads will strip instead of breaking some of the other parts in the die head mechanism.

Sleeve 52 is operatively connected to the sleeve 29 for axial movement therewith and for permitting relative rotation therebetween. This takes the form in the present construction of a clutch ring made in the form of two arcuate sections 53, 53 of bronze or other suitable material riding in a peripheral groove 29a of sleeve 29 and being bolted to the right hand face (Fig. 2) of threaded sleeve element 52. These clutch ring sections 53, 53 act as shoes coacting with groove 29a so that the sleeves 29 and 52 move axially together but may rotate relative to each other.

It should be now apparent that the thread cutting chaser holder slides 18 and their actuating sleeve 29 rotate together as a unit with the driving spindle 11 with this rotation taking place relative to both threaded elements 50 and 52 which are relatively stationary during the thread-cutting operation. The only movable threaded element, the threaded sleeve 52, rotates only during the adjusting movement of the slides 18 between the thread cutting and clearance positions. When the threaded sleeve 52 moves axially toward the right in Fig. 2, the thread cutting chasers 24 move inwardly toward the thread cutting position, being cammed by engagement of surface 30 of sleeve 29 with surfaces 18b of the die slides. When the sleeve 52 moves axially toward the left over the threads on threaded element 50, the thread cutting chasers 24 move outwardly to the clearance position under the control of sleeve 29 for removal from the workpiece.

For so moving sleeves 52 and 29, a power driven thread cutting chaser actuating means is provided, with this means operatively connected to the threaded sleeve element 52 for moving the thread chasers 24 between these extreme positions. This takes the form in the present disclosure of a double acting type pressure fluid actuated piston and cylinder motor having a piston 56 and cylinder 57 actuated by any suitable pressure fluid, such as air, etc. connected to conduits at 57a and 57b. Piston 56 has a piston rod 56a detachably secured at its right end in Fig. 1 to a bracket 58 on the machine head stock 10 by means of a threaded stud portion 56b of the piston rod and adjusting lock nuts 59 straddling the hole in the bracket 58 through which stud 56b projects. Cylinder 57 is detachably secured by bolts to a cylinder slide 62 reciprocable endwise in ways extending transversely of the rotational axis of the die head. These ways are formed by two brackets 63 and 64 in Fig. 2 with bracket 63 bolted to the threading machine head stock 10 and bracket 64 bolted to the bracket 63. A gear rack element 70 is bolted to the bottom of the cylinder slide 62 and reciprocable therewith along a path transverse to the threading axis. The rack element 70 coacts with a pinion element 71 formed by a gear tooth periphery on the threaded sleeve element 52 so that this sleeve 52 acts as a gear nut. Since bracket 58 in Fig. 1 and the threaded element 50 are both fixed to the machine head stock 10, fluid pressure actuation of the piston 56 will rotate the threaded sleeve 52 so as to move it along threaded element 50 and move the thread cutting chasers in a generally radial direction. Since the piston in cylinder unit 56, 57 is double acting, fluid pressure can be used for opening and closing the die head.

Adjustable stop means is operatively connected between the reciprocating rack element 70 and the stationary head stock 10 of the threading machine to prevent radial inward movement of the thread-cutting chasers 24 beyond the desired thread-cutting position so as to maintain and adjust the die cut thread size even when the die head is rotating. This stop means includes two stop portions in the form of stop plugs with one stop plug 75 in Fig. 1 carried by head stock 10 and the other stop plug 76 carried by the left end of the rack element 70.

Stop plug 75 is movable by adjustable means for accurately adjusting the thread cutting position of the chasers 24. This adjustment is provided by a cylindrical dial 80 pinned or otherwise secured to a threaded adjusting screw 81 for moving stop plug 75 either to the left or the right in Fig. 1. An internally threaded nut 82 coacts with the screw 81 and is supported against endwise movement and rotation in a supporting stop bracket 85 (omitted in Fig. 2 for clarity) fixed to threading machine head stock 10. This adjusting construction is very similar to that found in a micrometer. The dial 80 is calibrated so that a movement of one graduation thereof permits a corresponding radial movement in the thread-cutting position of the chasers 24.

The operation should now be apparent. The die head is closed to its thread-cutting position by having fluid pressure admitted to the left end of the cylinder 57 so as to reciprocate the rack 70 toward the left in Fig. 1 since the right end of the piston rod 56a is fixed to the machine head stock 10. The rack 70 rotates the pinion 71 in a counterclockwise direction in Fig. 1 to axially advance the threaded sleeve 52 toward the right in Fig. 2 and carry with it the die ring 29 so that the coacting tapered surfaces force the slides 18 inwardly to move the thread-cutting chasers 24 toward their inward or thread-cutting position. This movement continues until stop plugs 75 and 76 engage (Fig. 1) to determine accurately the thread-cutting position. The die head may be opened with the thread-cutting chaser moving to the clearance position for removal of the workpiece or stock by admitting fluid pressure to the right end of the cylinder 57 in Fig. 1 so that a reverse motion of the parts takes place. It should be noted that the die head can be opened and closed while it is rotating. Also, the thread-cutting chaser 24 can be accurately set to any desired thread-cutting position by means of the dial 80 even during machine operation.

The admission or exhaust of actuating fluid pressure to the cylinder 57 can be controlled either manually or by limit trip stops on the machine responsive to the approach of the thread-cutting chasers 24 to the end of the workpiece, to a shoulder, etc.

Various changes in details and arrangement of parts can be made by one skilled in the art without departing from either the spirit of this invention or the scope of the appended claims.

What I claim is:

1. In a rotatable die head, a rotatable die head body, thread chaser holders connected to said body for generally inward and outward movement between a thread cutting position and a clearance position for removal from the work piece, a chaser holder moving sleeve telescoped over said body and operatively connected to said holders by coacting tapered surfaces for causing inward movement of said holders in response to axial movement of said moving sleeve over said body, coacting male and female threaded and thread follower elements telescoped over said rotatable die head body with said female threaded element being a threaded sleeve, at least one of said elements being operatively connected to said chaser moving sleeve for causing axial movement thereof upon relative rotation of said elements, means holding the other of said elements stationary and fixed against axial movement relative to said chaser holders, said chaser holders and moving sleeve being constructed so as to rotate as a unit relative to both elements during thread cutting operation, and actuating means operatively connected to said one threaded element for moving said thread chaser holders between said positions, said actuating means including a rack movable along a path transverse to the threading axis and including a pinion carried by said one element coaxial with the axis of the thread to be cut and meshing with said rack and operative on said thread chaser holders to move them between said positions.

2. In a rotatable die head, a rotatable die head body, thread chaser holders connected to said body for generally inward and outward movement between a thread cutting position and a clearance position for removal from the work piece, a chaser holder moving sleeve telescoped over said body and operatively connected to said holders by coacting tapered surfaces for causing inward movement of said holders in response to axial movement of said moving sleeve over said body, coacting male and female threaded and thread follower elements telescoped over said rotatable die head body with said female threaded element being a threaded sleeve, at least one of said elements being operatively connected to said chaser moving sleeve for causing axial movement thereof upon relative rotation of said elements, means holding the other of said elements stationary and fixed against axial movement relative to said chaser holders, said chaser holders and moving sleeve being constructed so as to rotate as a unit relative to both elements during thread cutting operation, actuating means operatively connected to said one threaded element for moving said thread chaser holders between said positions, said actuating means including a rack movable along a path transverse to the threading axis and including a pinion carried by said one element coaxial with the axis of the thread to be cut and meshing with said rack and operative on said thread chaser holders to move them to thread cutting position, and adjustable stop means operatively connected to said rack to prevent further axial movement beyond said thread cutting position so as to maintain and adjust the die cut thread size, said adjustable stop means including a stop means with a first stop portion fixed with respect to said other element, including a second stop portion on said rack abutting against said first stop portion, and including adjustable means on one of said stop portions to accurately adjust the thread cutting position.

3. In a rotatable die head, a rotatable die head body, thread chaser holders connected to said body for generally inward and outward movement between a thread cutting position and a clearance position for removal from the work piece, a chaser holder moving sleeve telescoped over said body and operatively connected to said holders by coacting tapered surfaces for causing inward movement of said holders in response to axial movement of said moving sleeve over said body, coacting male and female threaded and thread follower elements telescoped over said rotatable die head body with said female threaded element being a threaded sleeve, at least one of said elements being operatively connected to said chaser moving sleeve for causing axial movement thereof upon relative rotation of said elements, means holding the other of said elements stationary and fixed against axial movement relative to said chaser holders, said chaser holders and moving sleeve being constructed so as to rotate as a unit relative to both elements during thread cutting operation, and power actuating means operatively connected to said one threaded element for moving said thread chaser holders between said positions, said power actuating means including a rack movable along a path transverse to the threading axis, including a fluid pressure operated cylinder and piston operatively connected between said other threaded element and said rack for causing movement of said rack across said axis, and including a pinion carried by said one threaded element coaxial with the axis of the thread to be cut and meshing with said rack and operative on said thread chaser holders to move them between said positions.

4. In a rotatable die head, as set forth in claim 3, wherein the threads on one of said elements has a shear strength less than the breakage strength of the other component parts having force exerted thereon by said fluid pressure, whereby said last mentioned threads will be the first to fail if jamming should occur.

5. In a rotatable die head, a die head body, thread chaser holders connected to said body for generally inward and outward movement between a thread cutting position and a clearance position for removal from the workpiece, a chaser holder moving sleeve telescoped over said body and operatively connected to said holders by coacting tapered surfaces for causing inward movement of said holders in response to axial movement of said moving sleeve over said body, coacting male and female threaded and thread follower elements telescoped over said rotatable die head body, one of said threaded elements being connected by a shoe and groove connection to said chaser moving sleeve for causing axial movement thereof upon relative rotation of said elements, means holding the other of said elements stationary and fixed against axial movement relative to said rotatable chaser holders during movement of said holders between said positions, means operatively connecting said chaser holders and moving sleeve to rotate as a unit relative to both elements during thread cutting operation, and means operatively connected to said one element for causing outward movement of said holders by relative rotational movement of said elements and opposite axial relative movement between said sleeve and body at the end of the thread cutting operation while the thread chasers are still cutting.

6. In a rotatable thread cutting apparatus, a rotatable body for said apparatus, thread chaser holders connected to said body for generally inward direction and outward direction movement between thread cutting and clearance positions for removal from the workpiece, a chaser holder moving member telescoped with said body and operatively connected to said holders by coacting tapered surfaces for causing movement of said holders in one of said directions in response to axial movement of said moving member relative to said body, coacting male and female threaded and thread follower elements telescoped over said rotatable body with said female threaded element being a threaded sleeve, at least one of said elements being operatively connected to said chaser moving member for causing axial movement thereof upon relative rotation of said elements; means holding the other of said elements stationary and fixed against axial movement relative to said chaser holders, said chaser holders and moving member being constructed so as to rotate as a unit relative to both elements during thread cutting operation; and actuating means operatively connected to said one threaded element for moving said thread chaser holders between said positions; said actuating means including a rack movable along a path transverse to the threading axis and including a pinion carried by said one element coaxial with the axis of the thread to be cut and meshing with said rack and operative on said thread chaser holders to move them between said positions.

7. In a rotatable thread cutting apparatus, a rotatable body for said apparatus, thread chaser holders connected to said body for generally inward direction and outward direction movement between thread cutting and clearance positions for removal from the workpiece, a chaser holder moving member telescoped with said body and operatively connected to said holders by coacting tapered surfaces for causing movement of said holders in one of said directions in response to axial movement of said moving member relative to said body, coacting male and female threaded and thread follower elements telescoped over said rotatable body, one of said threaded elements being connected by a shoe and groove connection to said chaser moving member for causing axial movement thereof upon relative rotation of said elements, means holding the other of said elements stationary and fixed against axial movement relative to said rotatable chaser holders during movement of said holders between said positions, means operatively connecting said chaser holders and moving member to rotate as a unit relative to both elements during thread cutting operation, and means operatively connected to said one element for causing movement of said holders in the other of said directions by relative rotational movement of said elements and opposite axial relative movement between said member and body at the end of the thread cutting operation while the thread chasers are still cutting.

References Cited in the file of this patent

UNITED STATES PATENTS

| | | |
|---|---|---|
| 733,446 | Wieland | July 14, 1903 |
| 890,848 | Dixon | June 16, 1908 |
| 1,433,818 | Hill | Oct. 31, 1922 |
| 1,592,170 | Wilkinson | July 13, 1926 |
| 1,835,292 | Flodin | Dec. 8, 1931 |
| 2,016,652 | Poole | Oct. 8, 1935 |

FOREIGN PATENTS

| | | |
|---|---|---|
| 553,818 | Great Britain | June 7, 1943 |